United States Patent [19]

Saban et al.

[11] Patent Number: 5,011,343

[45] Date of Patent: Apr. 30, 1991

[54] DRILLS

[76] Inventors: Oded Saban; Yaron Berger, both of 5 Kashani Street, Ramat Aviv G, Israel

[21] Appl. No.: 436,639

[22] Filed: Nov. 15, 1989

[51] Int. Cl.[5] ............................................. B23B 31/06
[52] U.S. Cl. .................................. 408/240; 279/1 K; 279/60
[58] Field of Search ...................... 279/1 K, 62, 61, 60; 408/241 R, 240; 81/16

[56] References Cited

U.S. PATENT DOCUMENTS

| | | | |
|---|---|---|---|
| 4,277,074 | 7/1981 | Kilberis | 279/62 |
| 4,317,578 | 3/1982 | Welch | 279/62 |
| 4,358,230 | 11/1982 | Rohlin | 279/62 |
| 4,389,146 | 6/1983 | Coder | 279/62 |
| 4,460,296 | 7/1984 | Sivertson, Jr. | 279/62 |
| 4,620,539 | 11/1986 | Andrews et al. | 279/1 K |

FOREIGN PATENT DOCUMENTS 3527234  2/1987  Fed. Rep. of Germany ..... 279/1 K

Primary Examiner—Daniel W. Howell
Attorney, Agent, or Firm—Fleit, Jacobson, Cohn, Price, Holman & Stern

[57] ABSTRACT

The subject of the invention is an attachment to all drilling apparatus which include one or more chucks.

The attachment is made to facilitate and speed up the invention into and removal from drill holding chucks.

The attachment compreses a set of two collars for every chuck. The first one of said collars is attached or forms part of the chuck and the second one is fixedly attached or forms part of the body of the respective apparatus. Within a slot in the second collar is movable a driver which can be brought into engagement with a recess in the face of the first collar. When in engagement, the driver causes the chuck to rotate and to open for insertion or to close for removal of a drill.

3 Claims, 5 Drawing Sheets

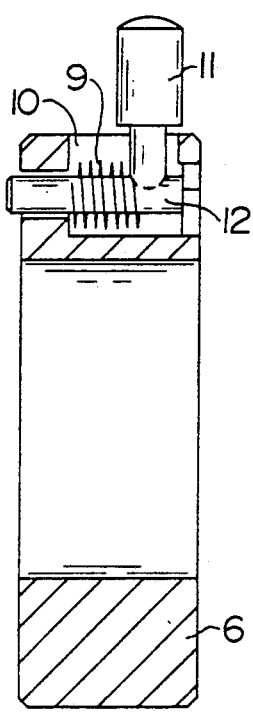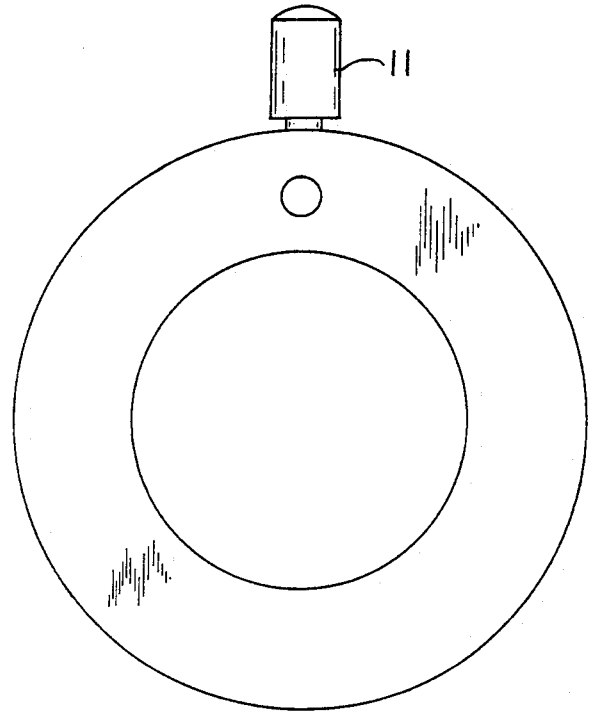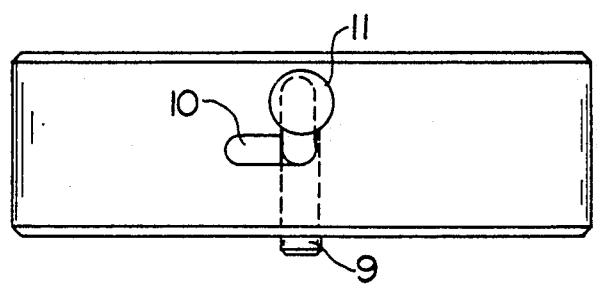
FIG. 6
FIG. 5
FIG. 7

DRILLS

FIELD AND BACKGROUND OF INVENTION

The present invention concerns drilling apparatus, such as drill presses or hand held electrical drilling devices. These apparatus generally comprise a drill chuck which by means of a number (mostly three) of jaws hold the respective drill. The introduction of the drill into the chuck is generally performed manually. The jaws are moved simultaneously towards or away from each other through actuation of an operating screw associated with each jaw and a geared ring. Usually a part of the chuck is turnable while a sleeve within which the jaws are movable is held stationary. Put differently: One member of the chuck is rotated relative to another part thereof.

Those frequently or continuously using drilling apparatus of whatever kind know well that the insertion of a drill into a chuck or removing it therefrom is a rather time consuming operation, especially so in view of the fact that inserting, removing or changing drills, particularly in metal working shops has to be attended to many times during a work day.

OBJECT OF THE INVENTION

It is the object of this invention to provide means which permit this time consuming operation to be performed mechanically using the drive means—generally electromotors—to rotate one of the two above mentioned parts of a drill chuck while the other one is held still.

SHORT STATEMENT OF NATURE OF INVENTION

Basically therefore the invention resides in the recognition of the fact that by fixedly connecting the chuck with a fixed location on the respective machine, one part of the chuck could be rotated by the drive, while another part is at standstill, so moving the jaws apart or close to one another in a most speedy way, thus enabling the insertion or removal of a drill in a fraction of the time needed now for that operation.

SHORT SUMMARY OF INVENTION

In the practical embodiment of the invention, therefore, in the drill chuck of a drilling apparatus (including drill presses) there is attached to or made integral with the exterior part of the chuck a collar having at its side which is directed away from the drill holding jaws a slot or recess, while a second collar is fitted on or made integral with the body of the respective machine or apparatus, a stub or the like being provided on that second collar adapted to be urged into and to be engaged by the said slot or recess in the first named collar.

In the drawings

FIGS. 5, 6 and 7 show the complementary part to that of FIGS. 3 and 4 in plan view, sectional elevational view and top view.

SHORT DESCRIPTION OF DRAWINGS

Figure 1:
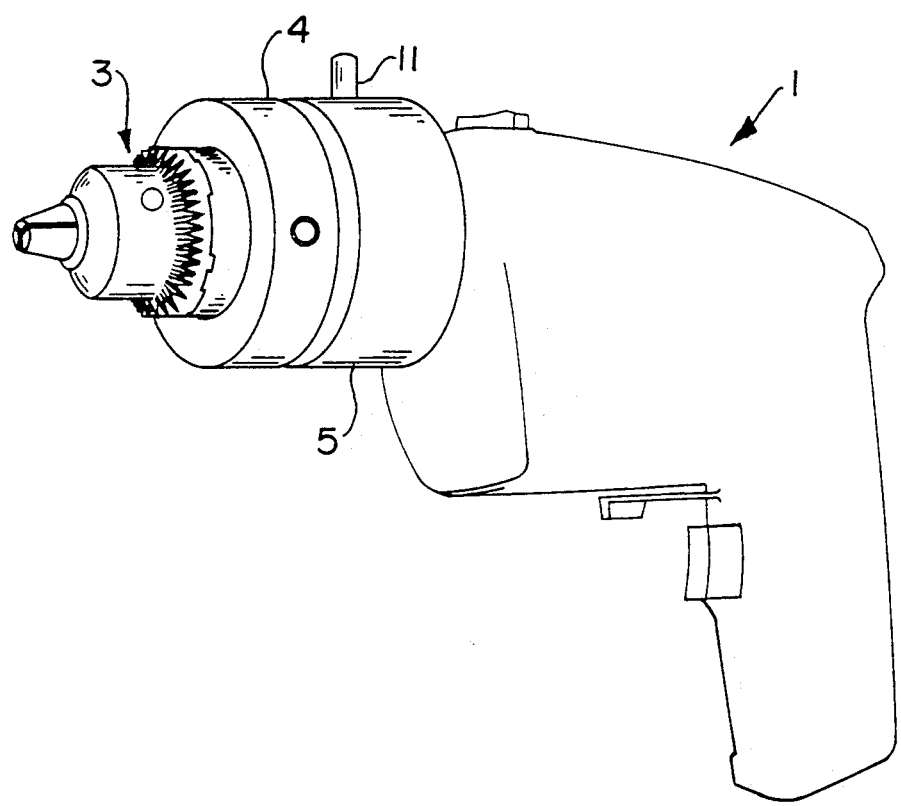
FIG. 1 is a perspective view of a hand held drilling apparatus fitted with the new means.

These and further features of the invention will become clear from the following detailed description which refers to the annexed drawings. FIG. 1 of the drawings shows, as a typical example, a hand held electrically actuated drilling apparatus, but it is pointed out that the new means provided to drilling machines are not restricted to their use on hand held devices but can be applied also to other machines which include drill chucks.

It can easily be seen that the means for connecting a chuck part to the respective machinery can form an attachment which can be mounted on the respective apparatus by the user thereof. Obviously it would also be possible to incorporate such means by the maker of the apparatus and deliver this to the final buyer in that form.

The hand held drilling apparatus shown in FIG. 1 is generally of conventional type. It comprises a casing 1 in which is housed the electrical motor, a gear and other conventional parts which do not require further description. A drive shaft 2 (see FIG. 2) leads to the chuck 3 which is of conventional design. So far there resides no novelty in the apparatus shown in the drawings.

Figure 2:
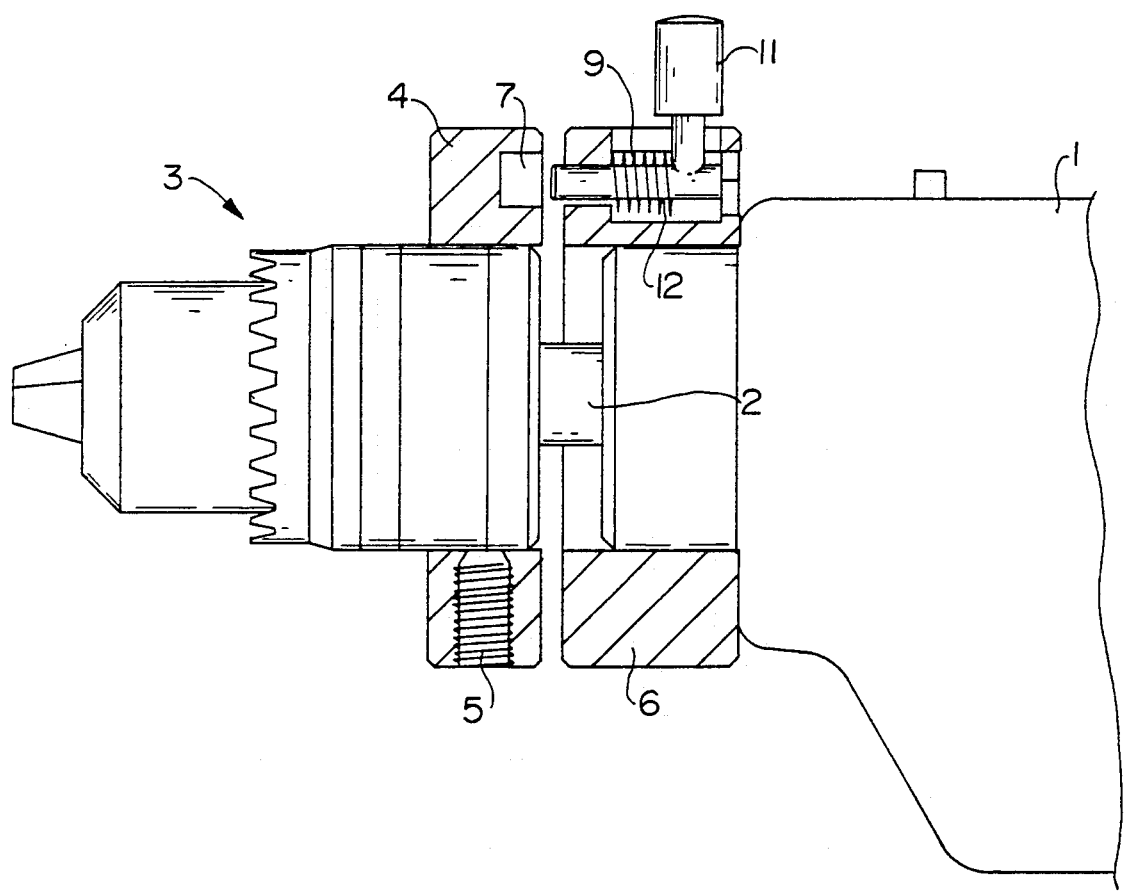
FIG. 2 is a lateral view of the new means, these means being shown in section, while the conventional chuck parts appear drawn in a side view.
Figure 4:
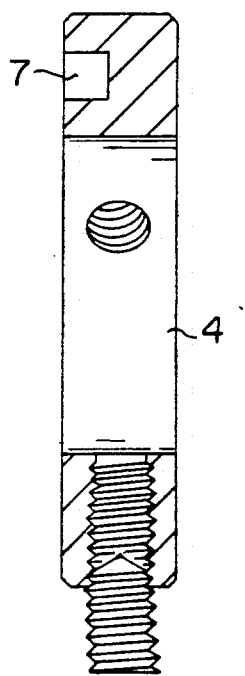
FIGS. 3 and 4 show one part of the new means in plan view and sectional, elevational view.
Figure 3:
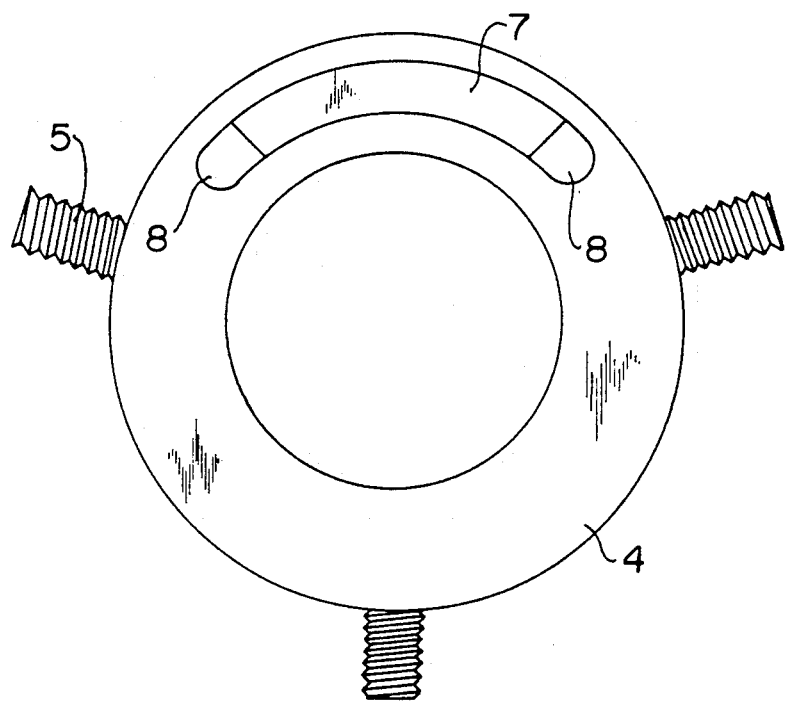

The new parts are constituted by a collar 4 which is fixed to rear portion of chuck 3 by means of set screws 5 (one of which is shown in FIG. 2). A second, like collar 6 is fixedly attached to the foremost portion of casing 1. In the rear side of collar 4 there is provided a bow shaped recess 7 (see also FIG. 3) at the two ends of which are positioned elastic buffers 8. The collar 6 (see also FIG. 6) includes a forwardly movable driver body constituted by a pin 9 which is seated in a bayonet slot 10. The pin 9 can be operated by a small grip 11. It is urged into rearward position by a spring 12. When moved forwardly, pin 9 is received in recess 7.

The new arrangement functions as follows: The pin 9 being moved forwardly and having entered the recess 7, the drive of the respective apparatus is switched on, imparting rotational movement to chuck 3 until the end of pin 9 hits one of the buffers 8. The effect of the contact between pin 9 and the end of recess 7 is that the rear part of chuck 3 on which collar 4 is seated is braked while the forward part thereof including the jaws is rotated, causing these latter to come apart, i.e. the chuck is opened for insertion of a drill.

Most hand held drilling apparatus are of the type in which the direction of rotation can be reversed, thus by so doing, the jaws can be caused to open up and release the respective drill which can be removed or can be permitted to drop from the chuck.

Figure 8:
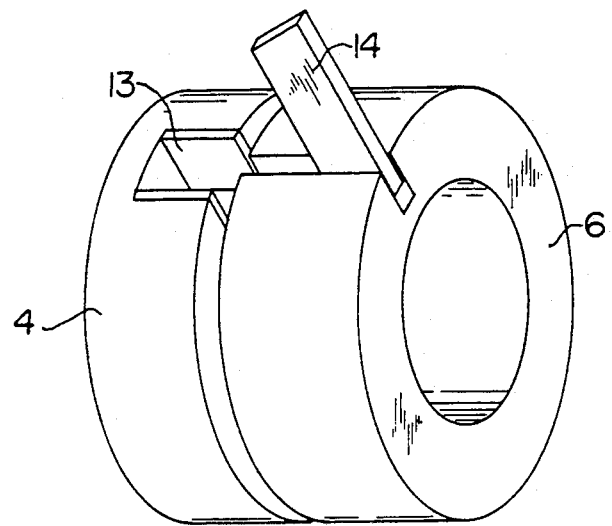
FIGS. 8 and 9 illustrate a slightly varied embodiment.
Figure 9:
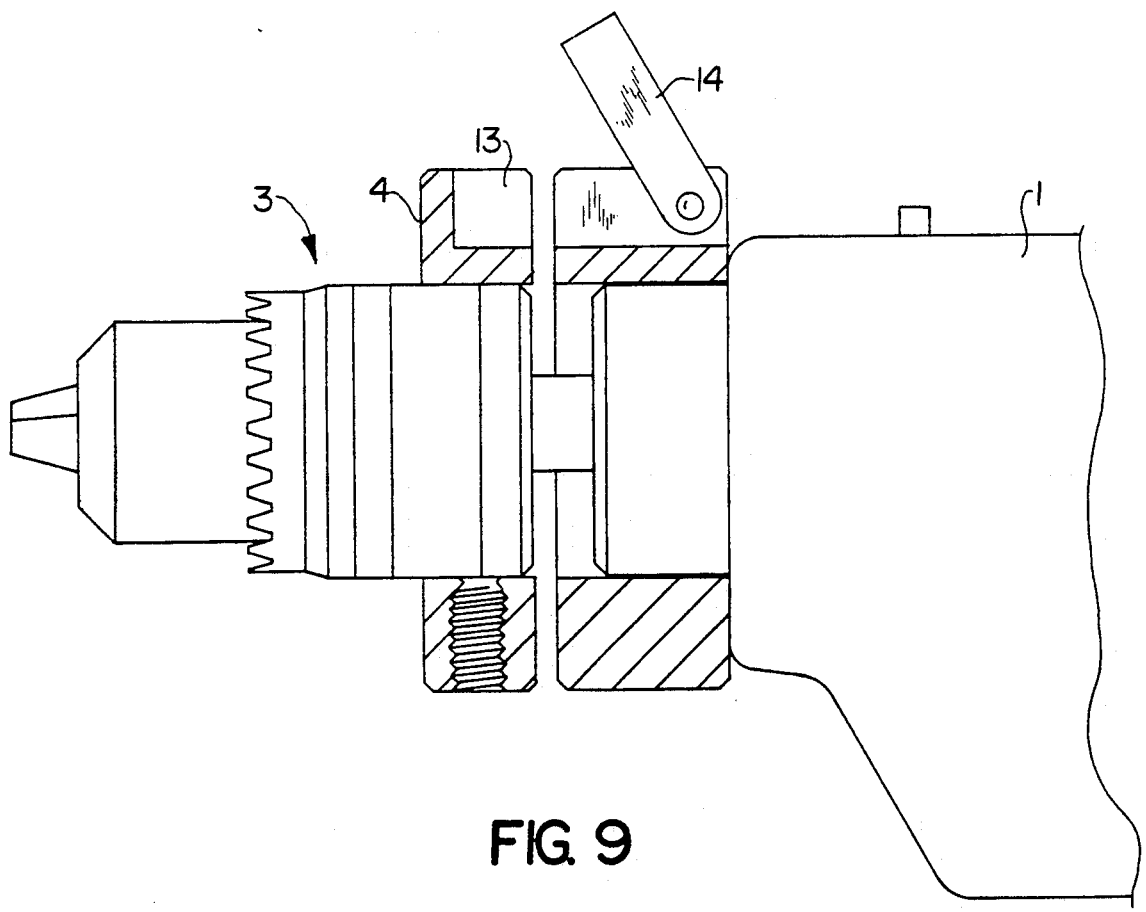

In the embodiment shown in FIGS. 8 and 9 the interconnection between collar 5 and 6 is effected by a recess 13 in collar 4 into which can be entered a pawl 14 swingingly attached to collar 6. The working of this construction is self understood.

Those skilled in the art understand that the invention would be applicable also to drill presses which include a multiple number of drive shafts and a corresponding number of chucks, the new attachment being applied to each and every one of the chucks.

We claim:

1. In drilling apparatus which include at least one chuck having a drilling axis, an attachment comprising first and second collars the first of which is firmly connected with the exterior part of the chuck and has at its side which is directed away from the drill holding jaws a bow-shaped recess and elastic buffers in the recess at respective ends of the recess while the second collar is fitted on the body of the respective drilling apparatus, a driver body parallel to said axis extending from the second collar towards the said recess and means for engaging the driver body in said recess in the first collar.

2. The attachment claimed in claim 1, characterized thereby that the two collars are affixed to apparatus which initially did not comprise such collars.

3. The attachment claimed in claim 1 characterized thereby that the first one of the two collars is attached to the rear portion of a chuck of the respective apparatus and the second collar is affixed to a fixed location on the respective apparatus.

* * * * *